(12) United States Patent
Wilding (10) Patent No.: US 7,206,975 B1
(45) Date of Patent: Apr. 17, 2007

(54) INTERNAL PRODUCT FAULT MONITORING APPARATUS AND METHOD

(75) Inventor: Mark F. Wilding, Barrie (CA)

(73) Assignee: International Business Machines Corporation, Armonk, NY (US)

(*) Notice: Subject to any disclaimer, the term of this patent is extended or adjusted under 35 U.S.C. 154(b) by 565 days.

(21) Appl. No.: 10/314,072

(22) Filed: Dec. 6, 2002

(30) Foreign Application Priority Data

Dec. 19, 2001 (CA) .................................. 2365427

(51) Int. Cl.
G06F 11/00 (2006.01)

(52) U.S. Cl. ...................................................... 714/47

(58) Field of Classification Search ................ 714/38, 714/47
See application file for complete search history.

(56) References Cited

U.S. PATENT DOCUMENTS

| | | | |
|---|---|---|---|
| 4,739,351 A | 4/1988 | Feldman | 342/169 |
| 5,463,775 A | 10/1995 | DeWitt et al. | 702/186 |
| 5,572,672 A | 11/1996 | Dewitt et al. | 714/47 |
| 5,636,376 A * | 6/1997 | Chang | 717/127 |
| 5,675,798 A * | 10/1997 | Chang | 709/224 |
| 5,751,963 A | 5/1998 | Umetsu | 709/223 |
| 5,850,562 A | 12/1998 | Crump et al. | 713/1 |
| 5,919,258 A | 7/1999 | Kayashima et al. | 713/201 |
| 6,049,798 A | 4/2000 | Bishop et al. | 707/10 |
| 6,070,190 A * | 5/2000 | Reps et al. | 709/224 |
| 6,167,538 A | 12/2000 | Neufeld et al. | |
| 6,237,114 B1 * | 5/2001 | Wookey et al. | 714/47 |
| 6,321,263 B1 * | 11/2001 | Luzzi et al. | 709/224 |
| 6,421,737 B1 * | 7/2002 | Stone et al. | 719/318 |
| 6,425,093 B1 * | 7/2002 | Singh et al. | 714/38 |
| 6,457,142 B1 * | 9/2002 | Klemm et al. | 714/38 |
| 6,631,409 B1 * | 10/2003 | Watson et al. | 709/224 |
| 6,691,244 B1 * | 2/2004 | Kampe et al. | 714/4 |
| 6,697,962 B1 * | 2/2004 | McCrory et al. | 714/27 |
| 6,728,907 B1 * | 4/2004 | Wang et al. | 714/47 |
| 6,732,359 B1 * | 5/2004 | Kirkpatrick et al. | 718/102 |
| 6,751,753 B2 * | 6/2004 | Nguyen et al. | 714/39 |
| 6,854,069 B2 * | 2/2005 | Kampe et al. | 714/4 |
| 6,883,120 B1 * | 4/2005 | Banga | 714/47 |

OTHER PUBLICATIONS ww.csit.fsu.edu/~burkardt/pdf/ibm/pssp_commands_v1.pdf Parallel System Supportt Programs For AIX: Command & Technical Reference. vol. 1 p. 137 By IBM.*

* cited by examiner

Primary Examiner—Bryce P. Bonzo
Assistant Examiner—Amine Riad
(74) Attorney, Agent, or Firm—Sawyer Law Group LLP (57) ABSTRACT

A method and system for monitoring and maintaining a primary service, its associated services and requisite system resources on a computer system. The system includes a fault monitor component and a system monitor component. The fault monitor component monitors and maintains the availability of the primary service, its associated services and the system monitor component. The system monitor component monitors and maintains the availability of the system resources. In the event of a fault in the primary service, its associated service or the system monitor component, the fault monitor component may notify an administrator, restart the service or take other corrective action. The operation of the fault monitor component is ensured through the operating system which will restart the fault monitor component in the event of a failure.

47 Claims, 3 Drawing Sheets

INTERNAL PRODUCT FAULT MONITORING APPARATUS AND METHOD

CROSS-REFERENCE TO RELATED APPLICATIONS

This application claims benefit under 35 USC 119 of Canadian Application 2,365,427 filed on Dec. 19, 2001.

1. Field of the Invention

The present invention relates to computer systems and, in particular, to a system and method for monitoring and maintaining a service, its associated services and system resources.

2. Background of the Invention

Users of computer technology are increasingly concerned with maintaining high availability of critical applications. This is especially true of enterprise users that provide a computer-implemented service or interface to customers. Maintaining continuous operation of the computer system is of growing importance for many businesses. Some estimates place the cost to United States businesses of system downtime at 4.0 billion per year.

The reasons for software failure fall into at least two categories. First, the software product may fail if the system resources become inadequate for the needs of the software product. This problem may be characterized as an inadequate or unhealthy operating environment. Second, even in a healthy operating environment, a software product may fail due to software defects, user error or other causes unrelated to the operating environment resources.

There are existing stand-alone monitoring products which monitor the operating system to gather data regarding system performance and resource usage. This information is typically displayed to the user upon request, usually in a graphical format, so that the user can visually assess the health of the operating environment during operation of one or more applications or services.

There are also existing fault monitors for use in a clustering environment that will identify a failed system, application or service and will restart the application or service or will move the application or service to another system in the cluster. Clustered environments are the most common approach to providing greater availability for critical applications or services. However, clustering technology tends to be complex, difficult to configure, and uses expensive proprietary technology. A clustered environment fails to provide adequate availability for various reasons, including the increased amount of hardware which increases the potential for hardware failure, the unfamiliarity of clustering to most system administrators, instability in the clustering software itself which will cause failure of the entire cluster, and network or communication problems.

It would be advantageous to provide higher availability for software products through limiting or correcting for software product failures whether caused by inadequate system resources or by problems unrelated to the system resources.

BRIEF SUMMARY OF THE INVENTION

The present invention comprises a system for increasing availability of a primary service on a computer, the system includes a system monitor component, wherein the system monitor component determines the status of system resources and is responsive to the status of the system resources, and a fault monitor component, wherein the fault monitor component determines the status of services, including the primary service and the system monitor component, and is responsive to the status of the services.

In another aspect, the present invention provides a method of increasing availability of a primary service on a computer system, the method includes the steps of providing a system monitoring component that determines the status of system resources; comparing the status of system resources against predetermined parameters for system resources and taking action in response to recognizing deficient system resources; providing a fault monitoring component that determines the status of the primary service and the status of the system monitoring component; taking action in response to recognizing an unhealthy status of the primary service; and taking action in response to recognizing an unhealthy status of the system monitoring component.

In yet another aspect, the present invention provides a computer program product that includes a computer readable medium carrying program means for increasing availability of a primary service on a computer system, the computer program product including code means for implementing the above described method. In a further aspect, the computer program product further includes code means for implementing the primary service.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
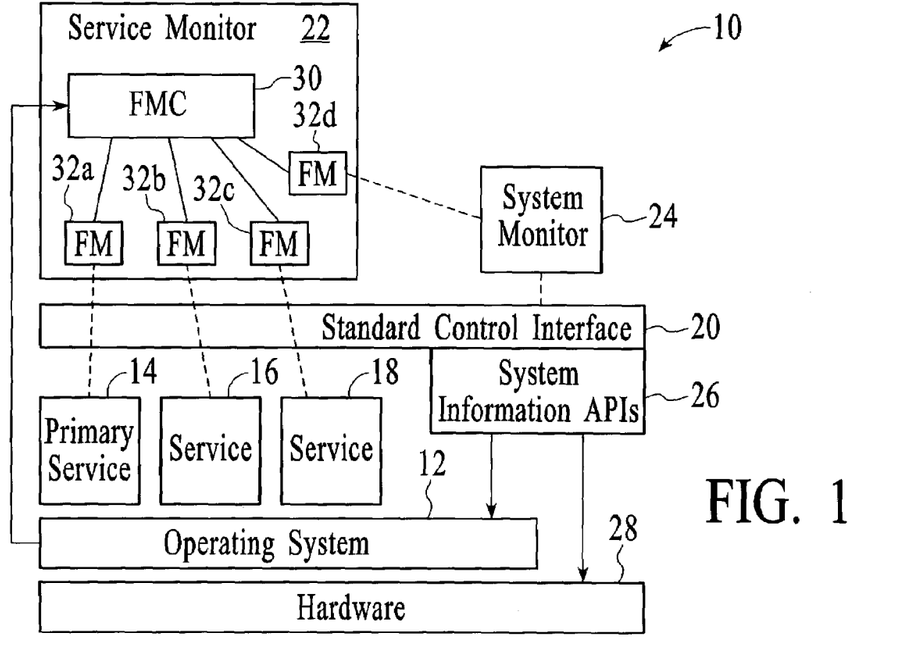
FIG. 1 shows a block diagram of a system according to the present invention.

Reference is first made to FIG. 1 which shows a block diagram of a system 10 according to the present invention. The system 10 is embodied within a general purpose computer or computers, clustered or unclustered. The computer(s) include hardware 28 and an operating system 12. Functioning or running upon the operating system 12 are one or more services. One of the services is a primary service 14, which comprises the main application program or software product that is required by a user, for example the DB2™ application program. The primary service 14 may employ other services denoted by references 16 and 18 to assist in performing its functions. For example, the primary service 14 such as the DB2™ application may employ an internet browser service such as the Netscape Navigator™ product or the Microsoft Internet Explorer™ product as a part of its functionality. In addition, there may be application programs or services (not shown) operating upon the system 10 that are not used in conjunction with the primary service 14.

Also functioning upon the operating system 12 are a service monitor 22 and a system monitor 24. The service monitor 22 monitors the primary service 14 and any of the associated services 16 and 18, including the system monitor 24. The system monitor 24 monitors the operating environment through system information application program interfaces, or APIs 26, which provide status information regarding the operating system 12 and the system hardware 28. In one embodiment, the system information APIs 26 are provided by a standard control interface 20.

The service monitor 22 ensures that the primary service 14 and its associated services 16 10 and 18 continue to function within prescribed parameters. In the event that the service monitor 22 detects abnormalities in the operation of the primary service 14 or its associated services 16 and 18, such as a program crash, program freeze or other error, the service monitor 22 takes corrective action. Such corrective action may include generating and sending an alert to a system administrator, restarting the failed service, and other acts, as will be described in greater detail below.

In addition to monitoring the primary service 14 and its associated services 16 and 18, the service monitor 22 also monitors the system monitor 24 to ensure it continues to function within prescribed parameters. The service monitor 22 will take corrective action in the event that the system monitor 24 malfunctions.

The system monitor 24 assesses the availability of resources in the operating environment that are required by the primary service 14. Examples of the resources that may be monitored are processor load, hard disk space, virtual memory space, RAM and other resources. The system monitor 24 monitors these resources and assesses their availability against prescribed parameters for safe operation of the primary service 14 and its associated services 16 and 18. If the system monitor 24 determines that a resource's availability has fallen below a prescribed parameter, then the system monitor 24 may take corrective action. Such corrective =action may include generating and sending an alert to a system administrator, adjusting the operation of the primary service 14 such that fewer resources are required, adding additional resources, terminating the operation of one or more other application programs or services, and other acts.

The service monitor 22 may include a fault monitor coordinator (FMC) 30 and various dedicated fault monitors (FM) 32, indicated individually by references 32*a*, 32*b*, 32*c* and 32*d* in FIG. 1. An instance of a fault monitor 32 is created for each instance of a service 14, 16, 18 and 24 that the service monitor 22 oversees. Each individual fault monitor 32 has responsibility for monitoring the instance of a single service. In the event that a fault monitor 32 detects an abnormality in the service (i.e. 14, 16, 18 or 24) that it is monitoring, the fault monitor 32 takes corrective action. The fault monitor coordinator 30 manages the creation and coordination of the various fault monitors 32 and ensures that the fault monitors 32 continue to operate. Collectively, the fault monitor coordinator 30 and the fault monitors 32 monitor the services on the system 10 to ensure that they remain alive and available.

According to this aspect, the service monitor 22 and the system monitor 24 ensure the high availability of the primary service 14 and its associated services 16 and 18 through monitoring the services themselves 14, 16 and 18 and the availability of operating environment resources. In order to ensure the availability of the service monitor 22 to perform this function, the operating system 12 ensures that the fault monitor coordinator 30 is operational. Typically, the operating system 12 provides a facility that can be configured to restart a service in the event of an unexpected failure. This facility can be employed to ensure that the fault monitor coordinator 30 is restarted in the event of an unexpected failure. For example, the Microsoft Windows 2000™ operating system permits the creation of service applications and service control managers. The service control manager in the Microsoft Windows 2000™ operating system is designed to monitor the service application for failures and can perform specific behaviours in the event of a failure, including restarting the service application. Accordingly, the fault monitor coordinator 30 may be created as a service application and a corresponding service control manager may be created for restarting the service application in the event of a failure. In this manner, the operating system 12 ensures the availability of the fault monitor coordinator 30, which, in turn, ensures the availability of the fault monitors 32. The individual fault monitors 32 ensure the availability of the system monitor 24 and the services. As a further example, with the Unix™ operating system the init daemon feature can be used to start and restart the fault monitor coordinator 30.

The system 10 also includes a service registry that is accessible to the service monitor 22. The service registry contains information used by the service monitor 22, such as which services to start-up and which services to monitor. In one embodiment, the service registry includes an entry for each instance of a service that is to be made available. Each service registry entry includes the name of the service, the path to its installation directory and an associated control module created using the standard control interface 20. Each service registry entry also has a unique identifier, so as to enable distinctions between separate instances of the same service. In one embodiment, the unique identifier is the user name of the instance. A service registry entry may also include user login information and instructions regarding whether the service should be started at boot time or only maintained available once the user has initiated the service. The service registry may be stored on disk, in memory or in any location accessible to the service monitor 22. When the fault monitor coordinator 30 is started, it checks the service registry to identify the instances of services that should be made available. For each such instance of a service, the fault monitor coordinator 30 then creates a fault monitor 32 to start and monitor the instance of a service.

The fault monitor coordinator 30 and the fault monitors 32 employ the standard control interface 20 for performing monitoring and corrective functions. In addition to providing monitoring capabilities, the standard control interface 20 should be able to stop a service, start a service, kill an unhealthy or unresponsive service and perform clean-up, such as flushing buffers and removing leftover resources used by the service. The specific tasks performed by the standard control interface 20, for example in a clean-up call, will be particular to a service and may be customized to each service. The fault monitors 32 are unaware of the operations involved in implementing the calls, such as what tasks are performed in a clean-up call for a specific service. Accordingly, the fault monitors 32 are flexible and may be employed with any primary service 14 and associated services 16 and 18. For a specific implementation, only the details of the standard control interface 20 calls as applied to each service need be customized. In one embodiment, the standard control interface 20 provides a customized associated control module for each particular service. The service registry provides the fault monitor coordinator 30 with information regarding where to find the associated control module for a particular service, and the fault monitor coordinator 30 passes this information on to the individual fault monitor 32.

In one embodiment, the standard control interface 20 provides two methods of monitoring a service and ensuring its health. The first method is to assess the status of the service. The second method is to perform custom probes. These methods are described in further detail below.

To obtain the status of a monitored service, a fault monitor 32 calls a status checking function defined by the standard control interface 20 with respect to the specific service being monitored. The standard control interface 20 uses three indicators to determine the status of a service: operability, aliveness and availability. Operability refers to the possibility that the service could be started. In almost all cases, if a service is installed on the system 10, then it is operable. Conversely, if it has not been installed, then it is not operable. In one embodiment, the operability of a service is dependent upon the existence of the command for starting the service. For example, to determine the operability of the Microsoft Internet Explorer™ application program, the standard control interface 20 could determine whether the command Iexplore.exe exists on the system 10.

Aliveness refers to whether the service has been started and is present in memory. In one embodiment, the standard control interface 20 determines if a service is alive by evaluating whether processes associated with the service are resident in memory. This evaluation indicates whether the service has been started and is present in memory on the system 10.

Availability refers to whether the service is in a "normal" mode in which it may take requests. For example, a relational database management engine may be in a maintenance mode or performing crash recovery, which renders it unavailable. Other services may have other modes in which they would be considered unavailable. The evaluation of availability by the standard control interface 20 is customized to particular services based upon their modes of operation. Some services may not have a mode other than available, in which case the standard control interface 20 may indicate that the service is available any time that it is alive.

If a service is available, it is necessarily alive and operable. Similarly, if a service is alive, it must be operable. Accordingly, there are five possible states that a service may be in, as shown in the following table:

|  | Operable | Alive | Available |
| --- | --- | --- | --- |
| Not operable | no | — | — |
| Operable, not alive | yes | no | — |
| Operable, Alive, not available | yes | yes | no |
| Operable, Alive and available | yes | yes | yes |
| State unknown | — | — | — |

In response to a call from a fault monitor 32 to get the status of a service, the standard control interface 20 provides the fault monitor 32 with a response that indicates one of the five states. The fault monitor 32 understands the significance of the results of a status check and may respond accordingly. The actions of the fault monitor 32 will generally be directed to ensuring that the service is available as soon as possible. For example, if a service is alive but unavailable, the fault monitor 32 may wait a short period of time and then re-evaluate the service to determine if the service has returned to an available status, failing which it may notify the system administrator. Similarly, if a service is operable and not alive, the fault monitor 32 may start the service. Alternatively, if a service is not operable, the fault monitor 32 may send a notification to the system administrator to alert the administrator to the absence of the service. Other actions in response to a particular status result may be custom designed for a particular service.

Figure 4:
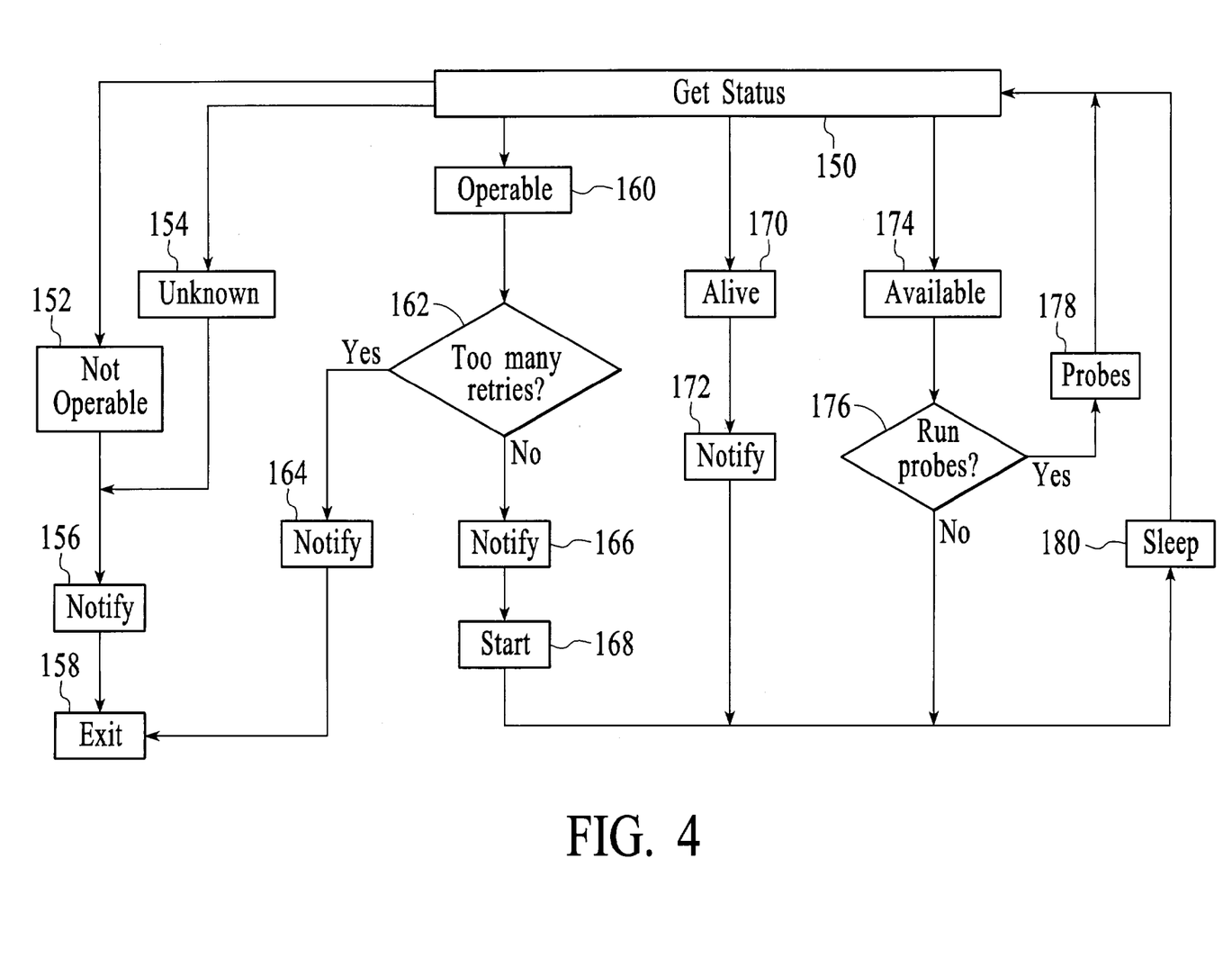
FIG. 4 shows a flowchart of a method of operation of a fault monitor according to the present invention.

Reference is now made to FIG. 4, which shows a flowchart illustrating a method of operation of a fault monitor 32 (FIG. 1) for obtaining and responding to the status of a service. The method begins, in step 150, when the fault monitor instructs the standard control interface 20 (FIG. 1) to determine the status of the service. As discussed above, the standard control interface 20 may return one of five results: not operable 152, unknown 154, operable 160, alive 170 or available 174.

If the status of the service is not operable 154, then it is not possible to start the service. Accordingly, the fault monitor 32 (FIG. 1) cannot take any action to make the service available, so it notifies a system administrator in step 156. Similarly, if the status of the service is unknown 154, then the fault monitor is unable to determine what action it could take to make the service available, so it notifies the system administrator 156. In the case of both a non-operable 152 and an unknown 154 status, the fault monitor 32 exits 158 its status monitoring routine, following the notification of an administrator.

If the status of the service is operable 160, then the fault monitor 32 (FIG. 1) will try to start the service in step 168. The fault monitor 32 maintains a count of how many times it has tried to start an operable service and prior to step 168 it checks to see if the count exceeds a maximum number of permitted retries in step 162. The maximum number may be set based upon the context and the type of service. It may also include a time-based factor, such as a maximum number of attempted starts within the past hour, or day or week. If the maximum has been reached, then the fault monitor 32 notifies the administrator 164 that it has attempted to start the service a maximum number of times and it exits 158 its status monitoring routine. If the maximum number has not been reached, then the fault monitor 32 notifies the system administrator 166 that it is attempting to start the service and then it attempts to start the service in step 168. The notification sent to the system administrator in step 166 may be configured to be sent only upon the initial attempt to start the service and not with each re-attempt should a preceding attempt fail to render the service alive 170 or available 174. After an attempt to start the service 168, the fault monitor 32 sleeps 180 or pauses for a predetermined amount of time before returning to step 150 to check the status of the service again.

In the event that the status of the service is determined to be alive 170, then, in step 172, the fault monitor 32 (FIG. 1) may simply notify the administrator that the service is alive but unavailable. A service may be alive but unavailable because it is temporarily in another mode of operation in which it cannot respond to requests, such as a maintenance mode or a crash recovery mode. Accordingly, the fault monitor 32 sleeps 180 for a predetermined amount of time before returning to step 150 to check the status of the service again.

If the status of the service is available 174, then the fault monitor 32 (FIG. 1) determines whether its service is testable by custom probes 176. If not, then the fault monitor sleeps 180 for a predetermined amount of time and returns to step 150 to re-check the status of the service to ensure it remains available. If the service is testable by custom probes, then the fault monitor 32 initiates the custom probes routine 178, as will be described below. Following the custom probes routine 178, the fault monitor 32 returns to step 150 to continue monitoring the status of the service.

An available service is considered able to take requests, however it is not guaranteed to take requests. An available status does not completely ensure that the service is healthy. Accordingly, once a service is determined to be available, further status information is required by the fault monitor 32 (FIG. 1) to assess the health of the service. This further information can be obtained through the use of custom probe functions. Custom probe functions tailored to a specific service may be created using the standard control interface 20 (FIG. 1).

In the context of the invention, custom probes perform an operation to test the availability of the specific service being monitored. The probes associated with a specific service are listed in a rule set accessible to the fault monitor 32 (FIG. 1), although the fault monitor 32 need not understand what each probe does. The rule set used by the fault monitor 32 tells it what probes to call and what to do if a particular probe fails. Accordingly, each service being monitored has a custom rule set governing which probes are run for that service and what to do in the event of failure in each case.

Figure 2:
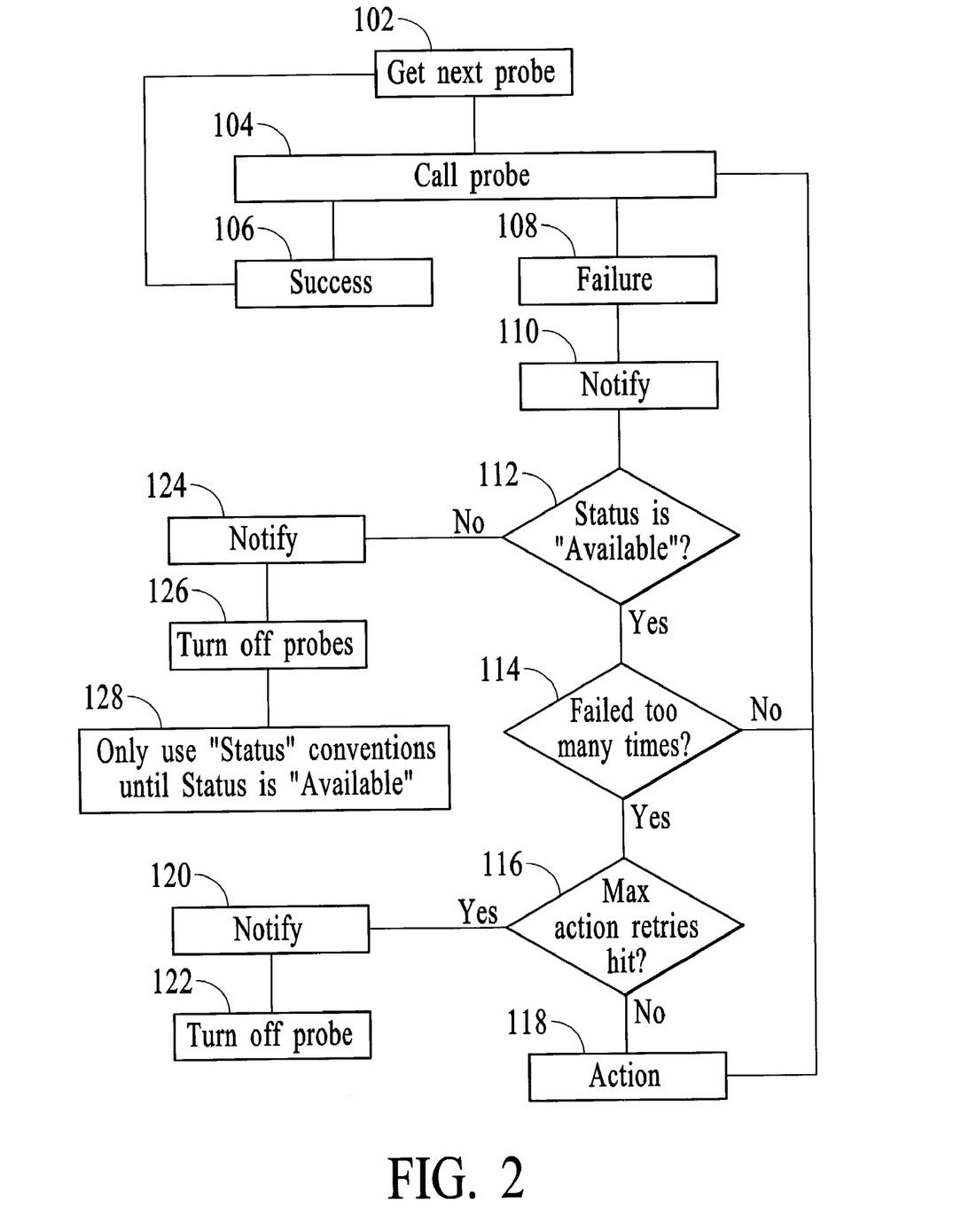
FIG. 2 shows a flowchart of a probe calling method for a fault monitor according to the present invention.

Reference is now made to FIG. 2 which shows in flowchart form a method for a calling convention for custom probe functions in accordance with the present invention. The method is initiated when the fault monitor 32 (FIG. 1) receives notification from the standard control interface 20 (FIG. 1) that the service is available 174 (FIG. 4) and is testable by custom probes 176 (FIG. 4). The fault monitor 32 determines the first probe function to be called with respect to the service it is monitoring by consulting the rule set associated with the service in step 102. Then in step 104, the fault monitor 32 calls the probe function. The probe function performs its operation and returns a result to the fault monitor 32 of either success 106 or failure 108. In the event of success 106, the fault monitor 32 returns to step 102 to consult the rule set to determine which probe function to call next. If no further probe functions need be called, then the fault monitor 32 enters a rest state until it is required to test the status of its service again. The fault monitor 32 may test the status of its service in scheduled periodic intervals or based upon system events, such as the start of an additional service on the system 10.

In the event that the probe function fails 108, the fault monitor 32 sends a notification 110 to the system administrator to alert the administrator to the possible availability problem on the system 10. The fault monitor 32 (FIG. 1) then re-evaluates whether the status of the service is "available" 112. If the service is still "available", then the fault monitor 32 assesses whether it has attempted to run this probe function too often 114. The fault monitor 32 maintains a count of the number of times that it runs each probe function and assesses whether it has reached a predetermined maximum number of attempts. If it has not reached the predetermined maximum number of attempts, then the fault monitor 32 returns to step 104 and calls the probe function again. The fault monitor 32 also keeps track of the fact it sent a notification 110 to the system administrator advising that the probe failed, so that it sends this notice only initially and not each time the probe fails.

If it has reached a maximum number of attempts, then the fault monitor 32 (FIG. 1) will proceed to take a corrective action. Before taking the corrective action, the fault monitor 32 will evaluate whether it has attempted to take the corrective action too many times 116. The fault monitor 32 maintains a count of the number of times it has attempted to take corrective action based upon the failure of the probe function and assesses whether it has reached a predetermined maximum number of attempts. If it has not reached the predetermined maximum number of attempts, then the fault monitor 32 takes the corrective action in step 118. The corrective action may, for example, comprise restarting the service. Following the corrective action, the fault monitor 32 returns to step 104 to call the probe function again. The corrective action 118 may include sending a notification to the system administrator that corrective action is being attempted. As with the failure of a probe, this notice would preferably only be sent coincident with the initial attempt at corrective action, and not with each re-attempt at corrective action so as to avoid an excessive number of notices. A successful corrective action should be communicated to the system administrator in step 106 when the subsequent call of the probe function succeeds.

If the fault monitor 32 (FIG. 1) tries to take the corrective action too many times and the probe function continues to fail, then the fault monitor 32 sends a notification 120 to the system administrator to alert the administrator to the failure of the corrective action. The fault monitor 32 then turns off the custom probe function 122 and enters a rest state to await the next status check.

If, in step 112, the fault monitor 32 (FIG. 1) finds that the service is no longer "available", then it sends a notice to the system administrator 124. The fault monitor 32 then turns off the use of the custom probes in step 126 and sets a condition 128 that only the status method (FIG. 4) will be used until the fault monitor 32 can cause the status to return to "available". Having terminated the probe calling routine, the fault monitor 32 enters a rest state until required to check the status of its service again.

An example of a probe function that may be utilized in connection with a service such as the Microsoft Internet Explorer™ application program is one which downloads a test webpage. Such a probe would instruct the Microsoft Internet Explorer™ browser program to open a predetermined webpage that may be expected to be available, such as a corporate homepage. If the browser is unable to load the webpage, a 404 error may be generated, which the probe function would interpret as a failure 108. Probe functions may be designed to test any other operational aspects of specific services.

One of the first services that the fault monitor coordinator 30 (FIG. 1) will create a fault monitor 32*d* (FIG. 1) for is the system monitor 24 (FIG. 1). The fault monitor 32*d* will then start the system monitor 24. When the system monitor 24 is initially started, it will read a set of rules that provide parameters within which the operating environment resources should be maintained in order to ensure a healthy environment for the primary service 14 (FIG. 1) and its associated services 16 and 18 (FIG. 1). For example, a rule may specify that there must be 1 Megabyte of RAM available to ensure successful operation of the primary service 14 and its associated services 16 and 18.

In one embodiment, the rule set comprises a system registry that includes a list of textual rules for various operating environment resources. Each entry includes a unique identifier of a resource, a parameter test and an action. For example, a system registry may contain the following entries:

FREE_DISK_SPACE/file_system "<10%" NOTIFY ADMINISTRATOR

FREE_VIRTUAL_MEMORY "<5%" RUN/opt/IBM/DB2

Each operating environment resource may have a unique resource identifier associated with it. The unique resource identifier may be implemented through a definition in a header file. For example, the header file may read, in part:
define OSS_ENV_FREE_VIRTUAL_MEMORY 1
define OSS_ENV_FREE_FILE_SYSTEM_SPACE 2

Some resources will require an additional identifier to ensure the resource is unique. For example, the resource "free file system space" is not unique on its own since there may be many file systems on a system. Accordingly, information may also be included about the specific file system in order to ensure that the resource identifier is unique.

Figure 3:
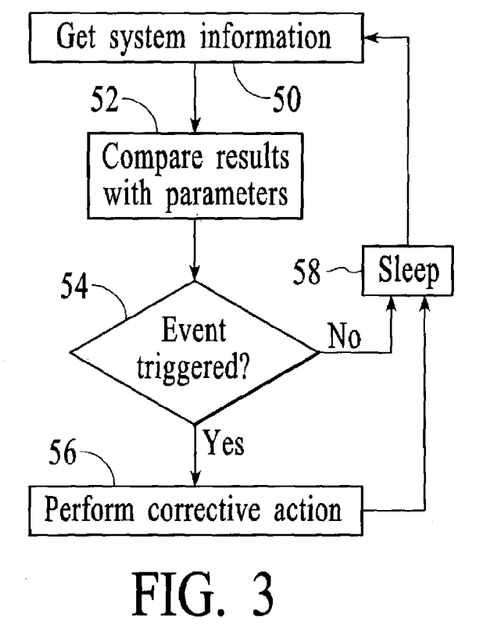
FIG. 3 shows a flowchart for the operation a system monitor according to the present invention.

Reference is now made to FIG. 3, which shows in flowchart form the operation of the system monitor 24 (FIG. 1). The system monitor 24 begins, in step 50, by obtaining system information regarding the operating system 12 and the hardware 28 (FIG. 1). As described above, the system information is obtained through system information APIs 26 (FIG. 1), and includes quantities such as processor load, available disk space, available RAM and other system parameters that influence the availability of software products. For example, the function statvfs can be used on the Solaris™ operating system to find the amount of free space for a specific file system. The system information APIs 26 may be provided through the same standard control interface 20 used by the fault monitors 32. Those skilled in the art will understand the methods and programming techniques for obtaining system information regarding the operating system 12 and the hardware 28.

In one embodiment, each resource identifier has an associated API function for obtaining information about that resource, and the function is correlated to the resource identifier through an array of function pointers. The system monitor 24, consults the system registry to determine the functions to call in order to gather the necessary information regarding the operating environment.

In step 52, the system monitor 24 (FIG. 1) then compares the gathered information to the rule set provided in the service registry. In one embodiment, the service monitor 24 gathers the information for each resource and then consults the rule set, although it will be understood by those skilled in the art that the service monitor 24 may obtain system information for one resource at a time and check for compliance with the rule set prior to obtaining system information for the next resource.

Based upon these comparisons and rules, the system monitor 24 determines, in step 54, whether a limit has been exceeded or a rule violated. If so, then the system monitor 24 proceeds to step 56 and takes corrective action. The rule set provides the corrective action to be taken for violation of each rule. For example, the rule set may provide that in the event that insufficient RAM is available that a system administrator be notified. Alternatively, for services that support dynamic re-configuration, the service could be instructed to use less RAM. As a further example, if the system monitor 24 determines that insufficient swap space is available, then the rule set may provide that system monitor 24 allocate additional swap space. The specific action is designed so as to address the problem encountered as swiftly as possible in order to ensure the high availability of the service operating upon the system. The full range of variations and alternative rule sets will be understood by those skilled in the art.

After checking each rule and taking corrective action, if necessary, the system monitor 24 enters a sleep 58 mode for a configurable amount of time to prevent the system monitor 24 from consuming too many resources.

Figure 5:
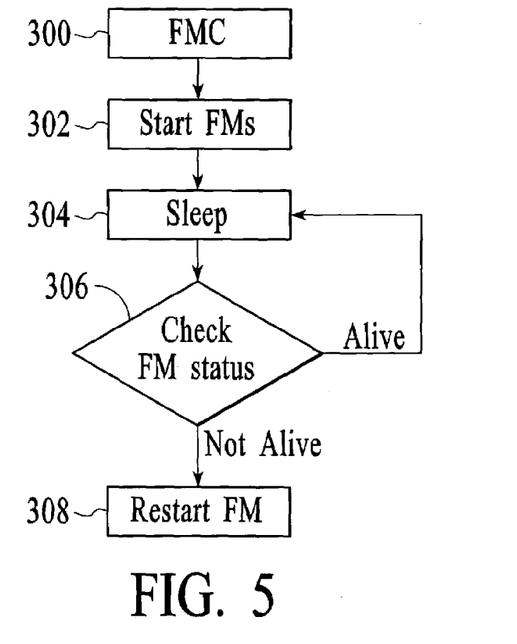
FIG. 5 shows a flowchart of a method of operation of a fault monitor coordinator according to the present invention.

Reference is again made to FIG. 1 in connection with the following description of the operation of an embodiment of the system 10. When initially started, the operating system 12 performs its ordinary start-up processes or routines for configuring the hardware 28 and establishing the operating environment for the system 10. In accordance with the present invention, the operating system 12 also starts the fault monitor co-ordinator 30. Throughout the duration of the system's 10 operation, the operating system 12 continues to ensure that the fault monitor co-ordinator 30 is restarted in the event of an unexpected failure. This is accomplished by use of a facility provided by the operating system 12 for restarting services that unexpectedly fail, as described above. Reference is now made to FIG. 5 which shows the operation of the fault monitor co-ordinator 30 (FIG. 1) in flowchart form. Once the fault monitor co-ordinator 30 is started 300, it consults the service registry to determine which services to monitor and then, in step 302, it creates an instance of a fault monitor 32 (FIG. 1) for each service. The instance of a fault monitor 32 may be created as a thread or a separate process, although a separate process is preferable as a more secure embodiment. Once each fault monitor 32 is created, the fault monitor co-ordinator 30 will enter a sleep state 304 for a predetermined amount of time. After the predetermined amount of time elapses, in step 306 the fault monitor co-ordinator 30 checks the status of each fault monitor 32 to ensure it is alive. If any fault monitor 32 is not alive, then the fault monitor co-ordinator 30 restarts the failed fault monitor 32 in step 308. Once the fault monitor co-ordinator 30 has checked the fault monitors 32 and restarted any failed fault monitors 32, then it returns to step 304 to wait the predetermined amount of time before re-checking the status of the fault monitors 32.

Referring again to FIG. 1, the fault monitor 32d created with respect to the system monitor 24, begins by checking the status of the system monitor 24. Initially, unless started by the operating system 12, the system monitor 24 will be operable, but not alive. Accordingly, the fault monitor 32d will start the system monitor 24. The fault monitor 32d will thereafter continue to execute the processes described above with respect to FIGS. 4 and 2 to monitor the status of the system monitor 24 and ensure its availability.

Other fault monitors 32 will operate similarly. The specific actions of an individual fault monitor 32 may be tailored to the particular service it is designed to monitor. In some instances, the fault monitor 32 may not be required to start a service at boot time when the fault monitor 32 is initially created. In those cases, the fault monitor 32 may simply wait for the service to be started by a user or the primary service 14, or the fault monitor 32 for such a service may not be created until the fault monitor co-ordinator 30 recognizes that the service has been started and should now be monitored. Instructions for an individual fault monitor 32 regarding when to start or restart its associated service may be provided by the fault monitor coordinator 30, which obtains its information from the service registry entry for that particular service.

The system monitor 24 will monitor the operating environment and take corrective action, as needed, to ensure the continued healthy operation and high availability of the primary service 14 and its associated services 16, 18, as described above.

Although the present invention has been described in terms of certain actions being taken by the service monitor 22 (FIG. 1), the fault monitor 32 (FIG. 1) or the system monitor 24 (FIG. 1), such as notifying a system administrator or restarting a service, it will be appreciated that other actions may be taken and, in some circumstances, it may be prudent for no action to be taken. Likewise, although notices are described as being provided to a system administrator, notification can be made to any individual or group of individuals and may include electronic mail, paging, messaging or any other form of notification.

Using the foregoing specification, the invention may be implemented as a machine, process or article of manufacture by using standard programming and/or engineering techniques to produce programming software, firmware, hardware or any combination thereof.

Any resulting program(s), having computer readable program code, may be embodied within one or more computer usable media such as memory devices, transmitting devices or electrical or optical signals, thereby making a computer program product or article of manufacture according to the invention. The terms "article of manufacture" and "computer program product" as used herein are intended to encompass a computer program existent (permanently, temporarily or transitorily) on any computer usable medium.

A machine embodying the invention may involve one or more processing systems including, but not limited to, central processing unit(s), memory/storage devices, communication links, communication/transmitting devices, servers, I/O devices, or any subcomponents or individual parts of one or more processing systems, including software, firmware, hardware or any combination or sub-combination thereof, which embody the invention as set forth in the claims.

One skilled the art of computer science will be able to combine the software created as described with appropriate general purpose or special purpose computer hardware to create a computer system and/or computer sub-components embodying the invention and to create a computer system and/or computer sub-components for carrying out the method of the invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system, comprising:
    a system monitor component, wherein the system monitor component determines an availability of one or more system resources of a computer and is responsive to the availability of the one or more system resources; and
    a fault monitor component, wherein the fault monitor component determines a status of one or more services supported by the computer and a status of the system monitor component, and is responsive to the status of the one or more services, the one or more services including a primary service.

2. The system defined in claim 1, wherein the fault monitor component further determines a status of one or more of associated services used by the primary service and is responsive to the status of the one or more associated services.

3. The system defined in claim 1, further comprising a standard control interface, wherein the standard control interface provides the fault monitor component with a status check function.

4. The system defined in claim 3, wherein the status check function provides the fault monitor component with the status of the one or more services in response to a call from the fault monitor component.

5. The system defined in claim 4, wherein the status is chosen from the group comprising non-operable, operable, alive, available, and unknown.

6. The system defined in claim 3, wherein the standard control interface further provides custom probe functions adapted to test the status of the one or more services.

7. The system defined in claim 6, further comprising a rule set stored in a memory associated with the system, wherein the rule set comprises a list of custom probe functions to be called by the fault monitor component with respect to the one or more services and an action corresponding to a failure of one or more of the custom probe functions.

8. The system defined in claim 3, wherein the standard control interface further provides the fault monitor component with a service start function, a service stop function, a service kill function, and a service clean-up function.

9. The system defined in claim 1, wherein the fault monitor component restarts the primary service when it determines that the primary service has stopped functioning normally.

10. The system defined in claim 1, wherein the fault monitor component restarts the system monitor component when it determines that the system monitor component has stopped functioning normally.

11. The system defined in claim 1, further comprising an operating system, wherein the operating system restarts the fault monitor component when it determines that the fault monitor component has stopped functioning normally.

12. The system defined in claim 1, wherein the fault monitor component sends a notification to a system administrator in response to an undesirable status of the one or more services.

13. The system defined in claim 1, further comprising a service registry accessible to the fault monitor component, wherein the service registry comprises a list of services to be monitored by the fault monitor component, including the primary service and the system monitor component.

14. The system defined in claim 13, wherein the list of services further includes one or more associated services used by the primary service.

15. The system defined in claim 13, wherein the service registry further comprises an action to be taken by the fault monitor component in response to a failure of each service to be monitored.

16. The system defined in claim 15, wherein the action comprises restarting an unavailable service.

17. The system defined in claim 1, further comprising a system registry accessible to the system monitor component, wherein the system registry comprises a list of the one or more system resources and the corresponding predetermined parameters against which the availability of the one or more system resources are evaluated by the system monitor component.

18. A method of monitoring a primary service on a computer system, the method comprising:
    determining an availability of one or more system resources of the computer system using a system monitor component;
    comparing the availability of the one or more system resources against predetermined parameters for the one or more system resources;

taking action in response to deficient system resources;

determining a status of one or more services supported by the computer system, and a status of the system monitor component using a fault monitor component, the one or more services including the primary service;

taking action in response to an unhealthy status of the primary service; and taking action in response to an unhealthy status of the system monitor component.

19. The method defined in claim 18, further comprising:

determining a status of one or more associated services used by the primary service using the fault monitor component; and taking action in response to an unhealthy status of the one or more associated services.

20. The method defined in claim 18, wherein determining the status of the primary service and the system monitor component comprises:

calling a status check function, the status check function being provided by a standard control interface.

21. The method defined in claim 20, wherein the status is chosen from the group comprising non-operable, operable, alive, available, and unknown.

22. The method defined in claim 20, wherein determining the status of the primary service and the system monitor component further comprises:

calling a custom probe function adapted to test the status of the one or more services.

23. The method defined in claim 18, wherein taking action in response to an unhealthy status of the primary service comprises:

restarting the primary service.

24. The method defined in claim 18, wherein taking action in response to an unhealthy status of the system monitor component comprises:

restarting the system monitor component.

25. The method defined in claim 18, further comprising:

restarting the fault monitor component in response to a failure of the fault monitor component.

26. The method defined in claim 18, wherein taking action in response to an unhealthy status of the primary service comprises:

notifying a system administrator.

27. The method defined in claim 18, further comprising:

accessing a service registry, the service registry comprising a list of services to be monitored by the fault monitor component, wherein the list of services includes the primary service and the system monitor component.

28. The method defined in claim 27, wherein the list of services further includes one or more associated services used by the primary service.

29. The method defined in claim 27, wherein the service registry further comprises an action to be taken by the fault monitor component in response to a failure of each service to be monitored.

30. The method defined in claim 29, wherein the action comprises restarting an unavailable service.

31. A computer program product comprising a computer readable medium, the computer readable medium including a computer readable program for monitoring a primary service on a computer system, wherein the computer readable program when executed on a computer causes the computer to:

determine an availability of one or more system resources of the computer system using a system monitor component;

compare the availability of the one or more system resources against predetermined parameters for system resources;

take action in response to deficient system resources;

determine a status of one or more services supported by the computer system, and a status of the system monitor component using a fault monitor component, the one or more services including the primary service;

take action in response to an unhealthy status of the primary service; and take action in response to an unhealthy status of the system monitor component.

32. The computer program product defined in claim 31, wherein the fault monitor component further determines a status of one or more associated services used by the primary service and is responsive to the status of the one or more associated services.

33. The computer program product defined in claim 31, wherein a standard control interface in the computer system provides the fault monitor component with a status check function.

34. The computer program product defined in claim 33, wherein the status check function provides the fault monitor component with the status of the one or more services in response to a call from the fault monitor component.

35. The computer program product defined in claim 34, wherein the status is chosen from the group comprising non-operable, operable, alive, available, and unknown.

36. The computer program product defined in claim 33, wherein the standard control interface further provides custom probe functions adapted to test the status of the one or more services.

37. The computer program product defined in claim 36, wherein a memory associated with the computer system stores a rule set comprising a list of custom probe functions to be called by the fault monitor component with respect to the one or more services and an action corresponding to a failure of one or more of the custom probe functions.

38. The computer program product defined in claim 33, wherein the standard control interface further provides the fault monitor component with a service start function, a service stop function, a service kill function, and a service clean-up function.

39. The computer program product defined in claim 31, wherein the fault monitor component restarts the primary service when it determines that the primary service has stopped functioning normally.

40. The computer program product defined in claim 31, wherein the fault monitor component restarts the system monitor component when it determines that the system monitor component has stopped functioning normally.

41. The computer program product defined in claim 31, wherein an operating system on the computer system restarts the fault monitor component when it determines that the fault monitor component has stopped functioning normally.

42. The computer program product defined in claim 31, wherein the fault monitor component sends a notification to a system administrator in response to an undesirable status of the one or more services.

43. The computer program product defined in claim 31, wherein a service registry in the computer system is accessible to the fault monitor component, the service registry comprising a list of services to be monitored by the fault monitor component, including the primary service and the system monitor component.

44. The computer program product defined in claim 43, wherein the list of services further includes one or more associated services used by the primary service.

45. The computer program product defined in claim 43, wherein the service registry further comprises an action to be taken by the fault monitor component in response to a failure of each service to be monitored.

46. The computer program product defined in claim 45, wherein the action comprises restarting an unavailable service.

47. The computer program product defined in claim 31, wherein a system registry in the computer system is accessible to the system monitor component, the system registry comprising a list of the one or more system resources and the corresponding predetermined parameters against which the availability of the one or more system resources are evaluated by the system monitor component.

* * * * *